United States Patent [19]

Schmitt-Matzen

[11] Patent Number: 5,083,747
[45] Date of Patent: Jan. 28, 1992

[54] HAT SHAPED ARMATURE FOR SOLENOID VALVE

[75] Inventor: Eric J. Schmitt-Matzen, Gloucester, Va.

[73] Assignee: Siemens Automotive L.P., Auburn Hills, Mich.

[21] Appl. No.: 646,302

[22] Filed: Jan. 28, 1991

[51] Int. Cl.⁵ .............................. F16K 31/06
[52] U.S. Cl. .................. 251/129.21; 251/129.15; 137/625.65
[58] Field of Search ............ 251/129.21, 129.15; 137/625.65

[56] References Cited

U.S. PATENT DOCUMENTS

| | | | |
|---|---|---|---|
| 1,587,921 | 6/1926 | Ray | 251/129.21 X |
| 2,695,685 | 11/1954 | Jamison | 251/129.21 X |
| 3,521,851 | 7/1970 | Sorrow | 137/625.65 X |
| 4,880,206 | 11/1989 | Lungu | 251/129.21 |
| 4,922,965 | 5/1990 | Meister | 251/129.21 X |

*Primary Examiner*—Arnold Rosenthal
*Attorney, Agent, or Firm*—George L. Boller; Russel C. Wells

[57] ABSTRACT

The armature has a circular cylindrical main body that is surrounded at one axial end by a circular flange. The flange can conduct what would otherwise be stray magnetic flux and because the flange is on a substantial radius, it can provide a significant area for the magnetic flux even though the flange's radial dimension is small. A number of channels are formed in the armature to provide for passage of fluid past the armature.

16 Claims, 2 Drawing Sheets

HAT SHAPED ARMATURE FOR SOLENOID VALVE

FIELD OF THE INVENTION

This invention relates generally to solenoid-operated fluid valves and particularly to an armature for a solenoid-operated hydraulic valve.

BACKGROUND AND SUMMARY OF THE INVENTION

Armatures of prior solenoid-operated hydraulic valves, particularly high pressure valves, were designed as straight cylinders so that the forces necessary to overcome the effects of the hydraulic fluid acting thereon could be achieved. Such designs are often confronted with the need to comply with diverse requirements, such as: they must develop sufficient operating force when the energizing voltage to the solenoid is significantly below its nominal potential; they must operate quickly when de-energized; they must pass fairly large flow rates; and they must be as compact as possible.

The most common way of compliance with a de-energization response requirement is by the incorporation of a return spring. The spring must overcome the collapsing magnetic field and any hydraulic stiction at the instant of de-energization. As a consequence, a stricter de-energization response requirement requires a higher spring force, but a higher spring force either slows the energization response or requires larger armature area for the magnetic flux, and attendant increase in valve size.

The need for the valve to handle a relatively high flow rate typically involves a relatively large valve lift (0.005-0.006 inch stroke for example) and a relatively large sealing area around the valve seat. These too thus require larger diameter armatures and attendant increases in valve size.

An improvement is attained by constructing the armature to a hat-shaped configuration. The brim of the hat is juxtaposed to the stator to allow the area across the non-energized working gap to be larger, but does not increase the nominal diameter of the armature along the crown of the hat. The brim allows the armature to benefit from all magnetic flux fringing that may take place adjacent the fully saturated area of the armature with the result that higher forces can be generated across the working gap. The higher forces enable the armature to comply with larger lift and sealing area requirements that accompany requirements for higher flow rates.

Since the brim of the hat provides a larger working gap area, it becomes feasible for the armature to comprise fluid flow channel structure that reduce the effect of the fluid on the armature. Consequently, the return spring force can be reduced to yield improved energization response.

The foregoing, as well as additional features, advantages, and benefits of the invention, will be seen in the ensuing description and claims, which are accompanied by drawings. The drawings disclose a presently preferred embodiment of the invention according to the best mode contemplated at the present time in carrying out the invention.

DESCRIPTION OF THE PREFERRED EMBODIMENT

Figure 1:
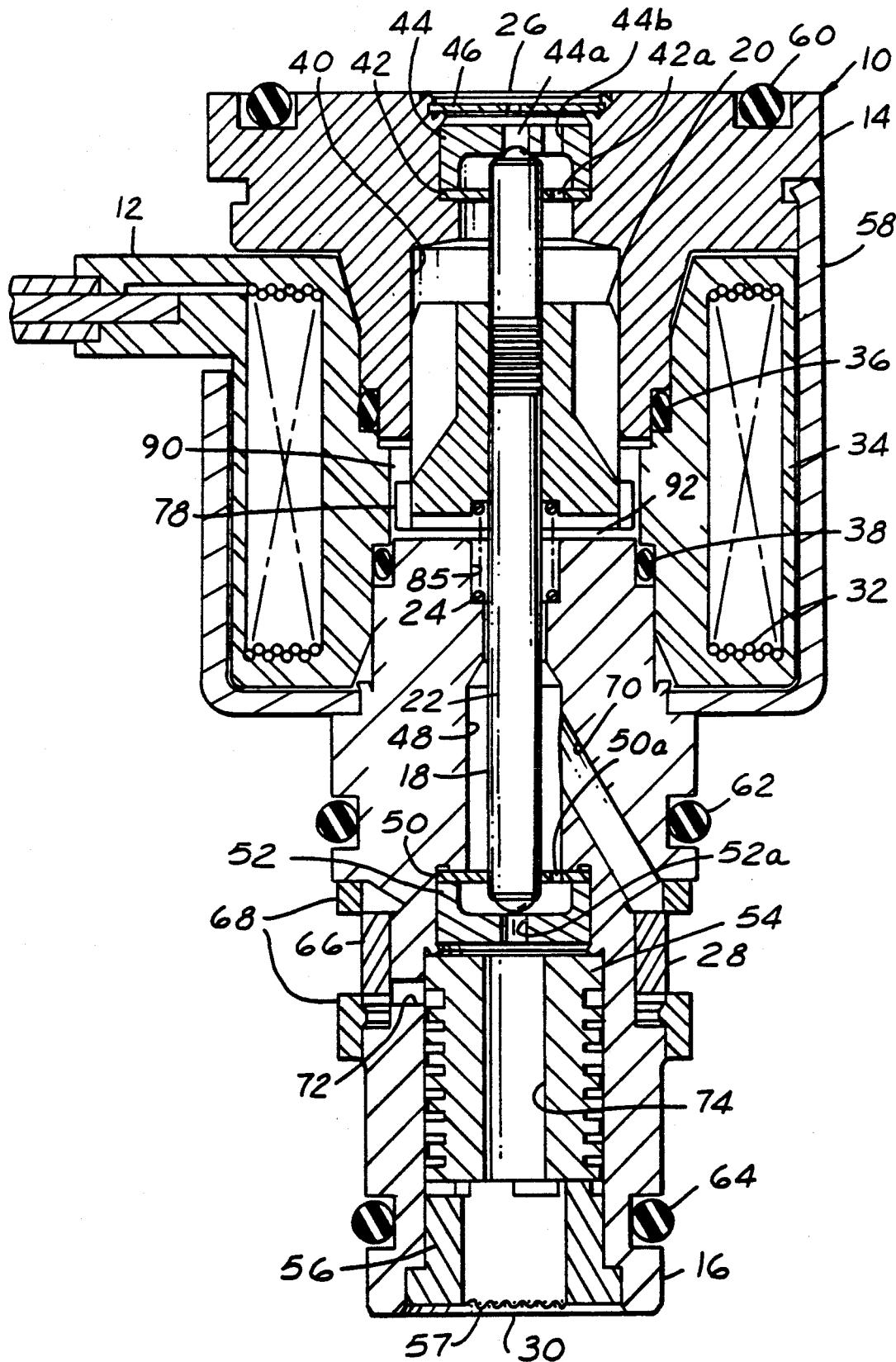
FIG. 1 is a longitudinal cross-sectional view through a solenoid valve embodying a fluid flow restrictor according to the invention.

FIG. 1 illustrates a solenoid valve 10 which comprises: a solenoid coil 12; two valve body pieces 14 and 16; an armature assembly 18 which consists of an armature piece 20 and a needle, or shaft, 22; and a helical coil spring 24. The valve has plural ports 26, 28, and 30, and internal passageway structure that communicates the ports.

Solenoid coil 12 comprises a length of magnet wire that is wound into a tubular coil 32. Coil 32 is itself encapsulated within a suitable encapsulating material 34 so that the solenoid coil also possesses a tubular shape. The ends of the wire forming coil 32 are connected to respective wires 35 that are brought out of encapsulating material 34 to provide for the electrical connection of the solenoid coil in a suitable electrical control circuit (not shown) for selectively energizing the solenoid coil.

Valve body piece 14 is constructed such that one axial end thereof fits into one axial end of solenoid coil 12; valve body piece 16 is constructed such that one axial end thereof fits into the opposite axial end of solenoid coil 12. O-ring seals 36 and 38 provide fluid-tight joints for these fits.

Valve body piece 14 comprises a multiple shouldered central circular through-bore 40. A segment of this through-bore provides a guide bore for armature piece 20. A shim member 42, a seat member 44, and an orifice plate member 46 are secured within through-bore 40 at port 26. Spring 24 is arranged between valve body piece 16 and armature piece 20 for resiliently biasing armature assembly 18 toward valve body piece 14.

Valve body piece 16 comprises a multiple shouldered central circular through-bore 48 within which are secured a needle guide member 50 and a seat member 52. A fluid flow restrictor element 54 is force-fitted within through-bore 48, as is a tubular element 56 that supports a transverse filter screen 57 across port 30.

A tubular shell 58 surrounds solenoid coil 12 and has its opposite axial ends staked to valve body pieces 14 and 16 in the manner shown. The solenoid valve also mounts external O-ring seals 60, 62, and 64 in the manner shown for sealing of the solenoid valve to the fluid circuit with which it is intended to be used. A filter element 66 covers port 28 and is held in place by retention band structure 68.

The internal fluid passageway structure comprises a skewed bore 70 which extends from port 28 to intercept through-bore 48 at a location which is between spring 24 and needle guide member 50, and a straight radial bore 72 which extends from port 28 to intercept through-bore 48 at a location adjacent the more interior axial end of restrictor element 54.

The position depicted by FIG. 1 is for solenoid coil 12 not electrically energized, and in this position spring 24 forces one axial end of needle 22 into seating engagement with seat member 44 while the opposite axial end of needle 22 is unseated from seat member 52. The spacing distance between the end of needle 22 and seat member 52 is somewhat exaggerated for illustrative purposes.

While details of flow restrictor element 54 are disclosed in FIGS. 5-7 and will be explained later on, it may for the moment be said that the co-operative effect between the flow restrictor element and the wall of that segment of through-bore 48 within which it is disposed is to create two parallel flow paths, one of which is relatively more restricted and the other of which is relatively less restricted. The relatively more restricted flow path extends between ports 28 and 30 and includes a series of restrictions that exists between the outside of element 54 and the wall of the segment of through-bore 48 containing the element. The relatively less restricted flow path between ports 28 and 30 is via a central circular through-hole 74 in element 54, and for the position illustrated by FIG. 1 where needle 22 is unseated from seat member 52, the relatively less restricted flow path continues from element 54 through members 52 and 50, through through-bore 48, and through skewed bore 70.

When solenoid coil 12 is suitable electrically energized, armature assembly 18 is displaced from the illustrated position to unseat needle 22 from seat member 44 and to close the relatively less restricted parallel flow path between ports 28 and 30 by seating the needle on seat member 52.

Figure 2:
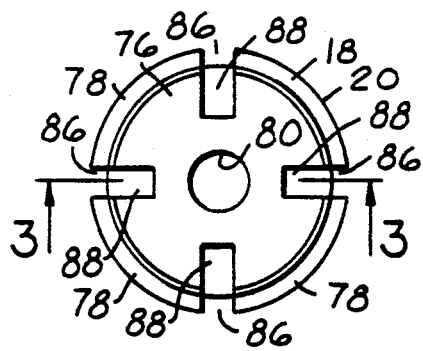
FIG. 2 is an axial end view of one of the elements of the solenoid valve of FIG. 1 shown by itself apart from the valve.
Figure 3:
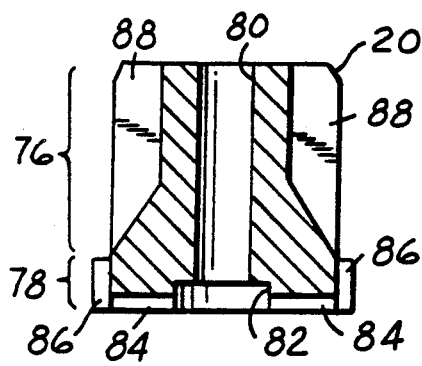
FIG. 3 is a transverse cross-sectional view taken in the direction of arrows 3—3 in FIG. 2.
Figure 4:
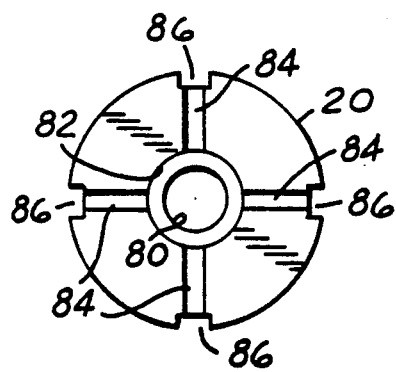
FIG. 4 is a view of the opposite axial end of FIG. 2.

Armature piece 20 possesses a novel construction for improved valve response, particularly in high pressure applications, and where the available voltage for operating the solenoid may drop significantly below the nominal operating potential. To this end armature piece 20 may be said to comprises a "hat-shaped" configuration As disclosed in full detail by FIGS. 2-4, this construction is embodied by a circular cylindrical main body 76 (the crown of the hat) that is surrounded at one axial end by a circular flange 78 (the brim of the hat). A central circular hole 80 for needle 22 passes completely through armature piece 20 and contains a circular counterbore 82 at the same axial end as flange 78. This counterbore forms a spring seat for one end of spring 24. The other end of the spring seats in a counterbore 85 as shown in FIG. 1. Armature piece 20 and needle 22 are joined by any suitable means to form the armature assembly 18.

A number of channels therein provide for passage of fluid past armature piece 20. There are four straight radial channels 84 in the face of the armature piece that is juxtaposed to the interior axial end of valve body piece 16. Channels 84 are open toward body piece 16 and are spaced ninety degrees apart about the armature's longitudinal axis. Each channel 84 extends from a point of communication with counterbore 82 to the radially outer edge surface of flange 78.

There are also four axial channels 86 that extend completely through flange 78. These channels are spaced ninety degrees apart around the armature piece and each is in communication with the radially outer end of a corresponding channel 84, and is open toward the wall of through-bore 40.

Channels 88 extend from flange 78 axially along the length of main body 76 to the end opposite flange 78. Channels 88 are arranged ninety degrees apart and are in circumferential registry with channels 84 and 86. As can be seen in FIG. 1, the organization and arrangement of solenoid coil 12 and valve body parts 14 and 16 are such that an interior space 90 is provided between parts 14 and 16 and this space is bounded by an annular wall surface of the encapsulating material 34. Flange 78 is disposed within this space, preferably in slightly inwardly spaced relation to the encapsulation surface. The spacing distance between parts 14 and 16 provides for the axial travel of flange 78 with the armature assembly, and also a suitable clearance for passage of fluid between channels 86 and 88. Immediately axially adjacent flange 78, each channel 88 is shaped to comprises a taper that becomes radially larger in the direction away from the flange. This taper ceases at a location where the radial dimension of the channel becomes constant. This shape is intended to promote smooth axial flow as the fluid passes along the armature.

Armature piece 20, body pieces 14 and 16, and shell 58 are of magnetically permeable material. A working gap 92 exists between the juxtaposed faces of armature piece 20 and valve body piece 16. With solenoid coil 12 not energized, this working gap has a maximum axial dimension; when the solenoid coil is suitably energized, the magnetic flux acts to attract armature piece 20 toward valve body piece 16 with the result that the axial dimension of the working gap is reduced. The construction of the armature piece is advantageous because the flange 78 can conduct a portion of the magnetic flux that would otherwise stray from the magnetically permeable material of the armature piece. Because the flange is on a substantial radius, it can provide a significant area for the magnetic flux even though its radial dimension is relatively small. Flange 78 serves to augment the attractive force that is exerted on the armature assembly when the solenoid coil is energized. Yet, the organization and arrangement is also advantageous at solenoid coil de-energization. The presence of flange 78 allows the channel structure to be incorporated into armature piece 20, and so the fluid passageways that are provided by the channel structure in the armature piece attenuate the fluid's effects on the armature motion so that spring 24 will be capable of quickly releasing its stored energy with maximum effectiveness when the solenoid coil is de-energized.

One of the advantages of the hat-shaped armature piece is that relatively large armature lifts can be achieved. The lift is established by the thickness of shim member 42, which can also perform a needle guide function, and it may be noticed that member 42 contains one or more holes 42a to allow fluid to pass freely through itself.

Figure 5:
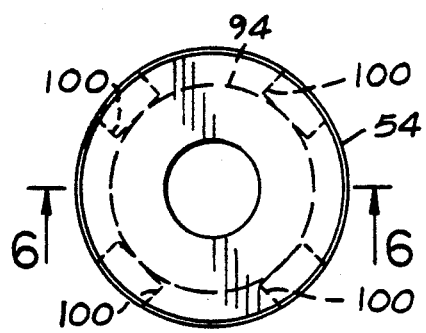
FIG. 5 is an axial end view of the fluid flow restrictor element by itself apart from the valve of FIG. 1.
Figure 6:
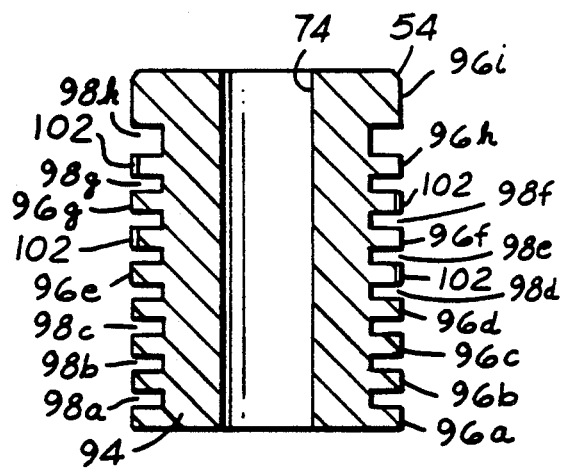
FIG. 6 is a longitudinal cross-sectional view taken in the direction of arrows 6—6 in FIG. 5.
Figure 7:
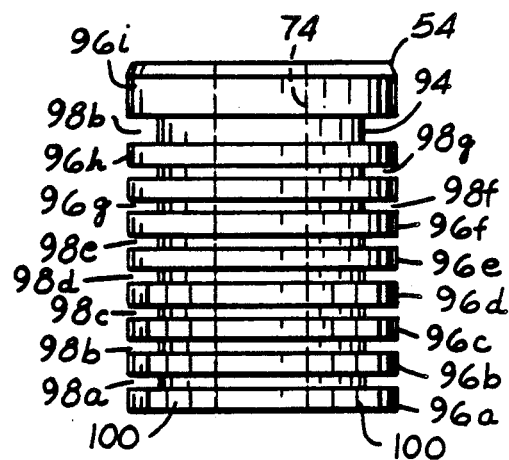
FIG. 7 is a longitudinal view of the fluid flow restrictor element.

Details of restrictor element 54 are presented in FIGS. 5-7. It comprises a circular cylindrical central core 94 that has a plurality of axially spaced apart flanges 96a, 96b, 96c, 96d, 96e, 96f, 96g, 96h, 96i that are integral with core 94. A series of axially spaced apart annular gaps 98a, 98b, 98c, 98d, 98e, 98f, 98g, 98h are thereby provided. Each flange 96a, 96b, 96c, 96d, 96e, 96f, 96g, 96h has a circularly contoured radially outer edge surface that is interrupted by at least one axially extending through-notch. For each of the flanges 96a, 96b, 96c, 96d there are four through-notches 100 arranged at ninety degrees around the flange. The through-notches 100 of each flange are in circumferential registry with those of the other three flanges. Each through-notch 100 is open in the radially outward direction and has spaced apart parallel side edge surface's which are bridged by a root edge surface so that the shape is generally rectangular. For each of the flanges 96e, 96f, 96g, 96h there is only a single through-notch 102, and the through-notches 102 of immediately consecutive flanges are diametrically opposite each other about the central longitudinal axis of the restrictor element, and are also out of registry with the through-notches 100 by forty-five degrees. Each through-notch 102 has a single edge surface that lies on a chord of an imaginary circle that defined by the circularly contoured outer edge surface of its flange. Flange 96i has a circumferentially continuous, uninterrupted circular edge surface.

The restrictor element is designed for a force fit with the wall of that segment of through-bore 48 within which it is disposed. Thus the perimeter of each flange may be considered as essentially sealed to the through-bore wall except where it is interrupted by a through-notch. When the restrictor element is viewed axially in its assembled relationship in the valve, the four through-notches 100 of each flange 96a, 96b, 96c, 96d have a much greater total area than does the single through-notch 102 of each flange 96e, 96f, 96g, 96h. Thus it is the through-notches 102 that provide the restrictive effect on fluid flow that takes place between the restrictor element and the wall of the through-bore segment into which it is force-fitted. The end flange 96i forms a complete closure with the wall of the through-bore since it lacks any through-notch.

Part 56 contains suitable notches at its interior axial end to provide fluid communication of port 30 to the through-notches 100 of flange 96a. From there communication with port 28 takes place through the through-notches 100, 102 and gaps 98, the gap 98h being in communication with radial bore 72.

Restrictor element 54 is advantageously fabricated by die casting or plastic molding techniques so that it has a unitary one-piece construction, as distinguished from the multi-piece stacked disc construction of prior restrictors. By selection of a suitable material it is possible for the restrictor element to better compensate for temperature-induced fluid viscosity changes than prior restrictors.

It should be understood that the specific embodiment of restrictor element that has been illustrated is exemplary. The number of flanges and the sizes and locations of the various through-notches will be a function of the particular specifications with which the restrictor element must comply when in use. Where a restrictor element must be available in certain different models, it is possible to satisfy different model requirements by fabricating a complete restrictor element as one model, and then shearing off a portion of the length of the complete element to yield a shorter length model having the appropriate number of flanges for achieving the desired restrictive effect.

The specific embodiment of valve 10 that is illustrated in FIG. 1 is intended for use in one specific automotive ABS system, and is sometimes referred to as a build and decay valve. The valve may be generally described as a vented two-way valve. When the solenoid is de-energized, needle 22 is unseated from seat member 52 so that what amounts to an unrestricted flow path exists between ports 28 and 30. This unrestricted flow path extends from port 30, through screen 57, through part 56, through through-hole 74, through a central hole 52a in member 52, through a pattern of holes 50a in member 50, through through-bore 48, through skewed bore 70, and through screen 66 to port 28. When the solenoid is fully energized, the closure of hole 52a by needle 22 closes this unrestricted flow path so that only what is referred to as a restricted flow path exists. This restricted flow path extends from port 30, through screen 57, through part 56, through the restricted path between the side of restrictor element 54 and the wall of through-bore 48, through radial bore 72, and through filter screen 66 to port 28. Although member 44 is shown to comprise a central hole 44a that is closed when the solenoid is de-energized, it also comprises a hole 44b that always remains open. Thus the solenoid valve is always vented to port 26 irrespective of the condition of solenoid energization. Orifice plate member 46 contains suitable orifice means that is used to control the vent rate.

Other valve configurations are also contemplated, for example a three-way pulse width modulated valve. These other configurations may involve various modifications of the construction illustrated in FIG. 1. Such modifications may include changes to and/or relocations of and/or omissions of one or more of the valve's parts, such as members 42, 44, 46, 50, 52, 54.

What is claimed is:

1. In a solenoid-operated fluid valve that comprises an electrically energizable solenoid coil, a magnetic circuit path for magnetic flux issued by said solenoid coil, said magnetic circuit path including stator means and armature means, said valve comprising spring means for resiliently biasing said armature means in one direction along an axis over which said armature means is reciprocated in response to selective energization of said solenoid coil, said armature means comprising a valve element arranged for co-operation with a valve seat to control the flow of fluid through the valve according to the position of said armature means along said axis, said armature means comprising an armature piece, said stator means comprising a stator piece, said pieces comprising respective faces mutually juxtaposed to define a working gap for said magnetic circuit path, the improvement which comprises:

said armature piece comprising a cylindrical main body of nominal outside diameter that fits closely within and is guided by a guide means as said armature means is reciprocated, and said cylindrical main body having annular flange means extending circumferentially around said main body radially outwardly beyond said nominal outside diameter at said working gap so as to radially overlap said guide means, said armature piece being disposed in the flow of fluid that is controlled by said valve element.

2. The improvement set forth in claim 1 in which said armature piece comprises fluid passageway means for conveyance of the fluid flow.

3. The improvement set forth in claim 2 in which said fluid passageway means comprises at least one radial channel, in said face of said armature piece, said at least one radial channel being open toward said face of said stator piece.

4. The improvement set forth in claim 3 in which said fluid passageway means also comprises at least one axial channel through said flange means.

5. The improvement set forth in claim 1 in which said at least one axial channel through said flange means is open in the radially outward direction and intersects said at least one radial channel.

6. The improvement as set forth in claim 4 in which said main body comprises at least one axial channel that extends axially beyond said flange means relative to said face of said armature piece and that is in fluid communication with said at least one axial channel through said flange means.

7. In a solenoid-operated fluid valve that comprises an electrically energizable solenoid coil, a magnetic circuit path for magnetic flux issued by said solenoid coil, said magnetic circuit path including stator means and armature means, said valve comprising spring means for resiliently biasing said armature means in one direction along an axis over which said armature means is reciprocated in response to selective energization of said solenoid coil, said armature means comprising a valve element arranged for co-operation with a valve seat to control the flow of fluid through the valve according to the position of said armature means along said axis, said armature means comprising an armature piece, said stator means comprising a stator piece, said pieces comprising respective faces mutually juxtaposed to define a working gap for said magnetic circuit path, the improvement which comprises:

said armature piece comprising a cylindrical main body of nominal outside diameter and said cylindrical main body having annular flange means extending circumferentially around said main body beyond said nominal outside diameter at said working gap, said armature piece being disposed in the flow of fluid that is controlled by said valve element, said armature piece comprising fluid passageway means for conveyance of the fluid flow, said fluid passageway means comprising at least one radial channel in said face of said armature piece, said at least one radial channel being open toward said face of said stator piece, said fluid passageway means also comprising at least one axial channel through said flange means, and said main body comprising at least one axial channel that extends axially beyond said flange means relative to said face of said armature piece and that is in fluid communication with said at least one axial channel through said flange means.

8. In a solenoid-operated fluid valve that comprises an electrically energizable solenoid coil, a magnetic circuit path for magnetic flux issued by said solenoid coil, said magnetic circuit path including stator means and armature means, said valve comprising spring means for resiliently biasing said armature means in one direction along an axis over which said armature means is reciprocated in response to selective energization of said solenoid coil, said armature means comprising a valve element arranged for co-operation with a valve seat to control the flow of fluid through the valve according to the position of said armature means along said axis, said armature means comprising an armature piece, said stator means comprising a stator piece, said pieces comprising respective faces mutually juxtaposed to define a working gap for said magnetic circuit path, the improvement which comprises:

said armature piece comprising a cylindrical main body of nominal outside diameter and said cylindrical main body having annular flange means extending circumferentially around said main body beyond said nominal outside diameter at said working gap, said armature piece being disposed in the flow of fluid that is controlled by said valve element, and said spring means comprising a helical coil spring disposed between said stator piece and said armature piece, and said armature piece comprising fluid passageway means for conveyance of the fluid flow, said fluid passageway means comprising a first passageway segment that extends radially from said spring means, then axially through said flange means, and then axially through that portion of said main body that is axially said flange means relative to said face of said armature piece.

9. The improvement set forth in claim 8 in which said main body comprises a central through-hole and said valve element is at one axial end of a shaft that passes through said throughhole, said shaft also passing through said helical coil spring.

10. An armature piece for use in a solenoid valve, said armature piece comprising:

a cylindrical main body having a nominal outside diameter and said cylindrical main body having annular flange means extending circumferentially around said main body beyond said nominal outside diameter adjacent one end of said main body, said armature piece comprising a central through-hole, a spring seat in said through-hole at said one end of said main body, at least one radial channel extending radially outwardly from said spring seat in said main body to said flange means, at least one axial channel in said armature piece extending through said flange means and establishing in cooperation with said at least one radial channel a fluid passageway means that extends from said spring seat and beyond said flange means.

11. An armature piece as set forth in claim 10 further including at least one axial channel in that portion of said main body that is beyond said flange means to provide a continuation of said fluid passageway means beyond said flange means.

12. A solenoid-operated fluid valve comprising:
a solenoid coil which is encapsulated within a tubular encapsulation;
magnetically permeable valve body pieces which are fitted in a sealed manner into opposite axial ends of said tubular encapsulation;
one of said valve body pieces comprising a guide bore;
an armature piece having a main body that fits closely within said guide bore for axial guidance of motion of said armature piece;
said valve body pieces and said tubular encapsulation cooperatively defining an internal space within said valve, said internal space being radially bounded by an annular surface of said tubular encapsulation which lies radially outwardly of said guide bore;
said armature piece comprising annular flange means extending circumferentially around said main body radially outwardly beyond said guide bore toward said surface of said tubular encapsulation;
said valve being a fluid passageway means, a segment of which is cooperatively defined between said flange means and said surface of said tubular encapsulation.

13. A valve as set forth in claim 12 in which said flange means comprises at least one axial channel extending through said flange means, said at least one axial channel being open toward said surface of said tubular encapsulation.

14. A valve as set forth in claim 13 in which said armature piece comprises at least one radial channel that is open toward the other of said valve body pieces and intersects said at least one axial channel.

15. A valve as set forth in claim 14 in which another segment of said fluid passageway means is cooperatively defined between said main body of said armature piece and said guide bore by means of at least one further axial channel.

16. A valve as set forth in claim 15 in which said at least one further axial channel comprises an axial channel in said main body of said armature piece that is open toward said guide bore.

* * * * *